Figure 1:
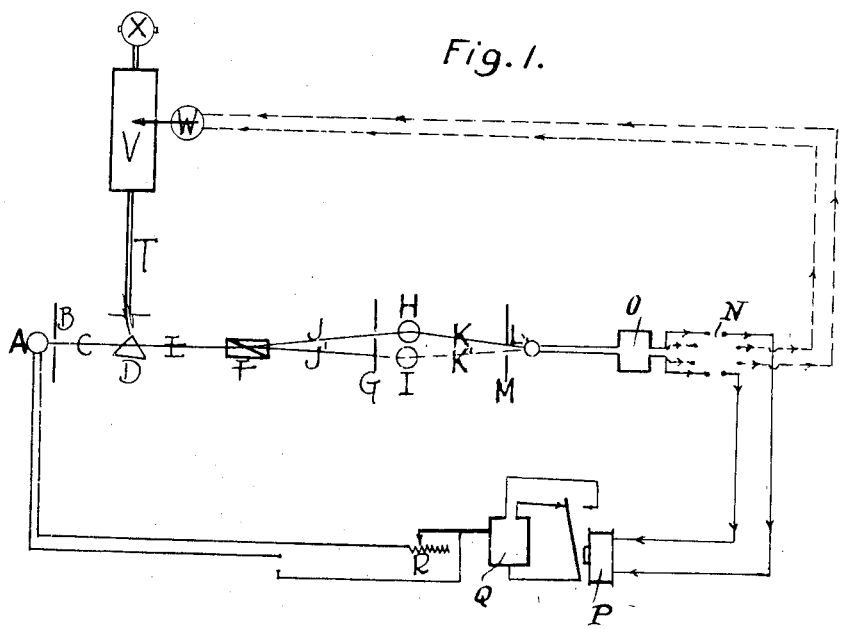
Figure 2:
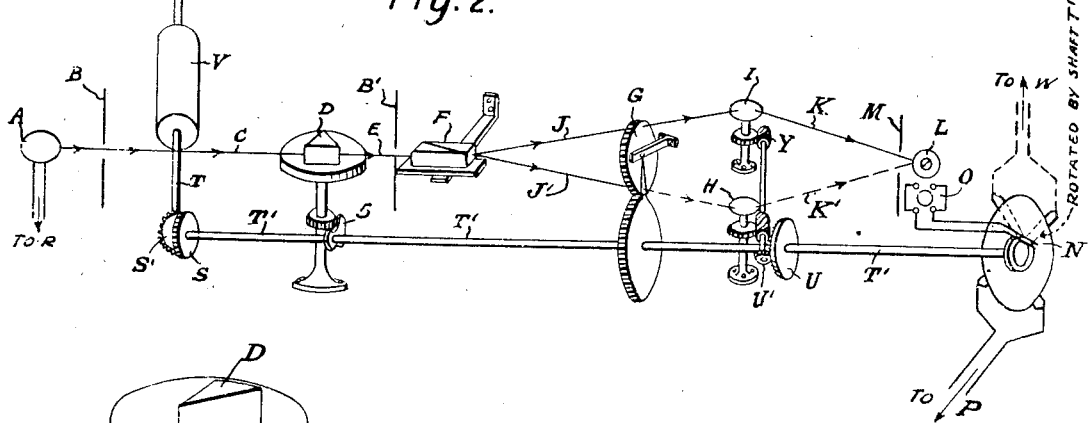
Figure 3:
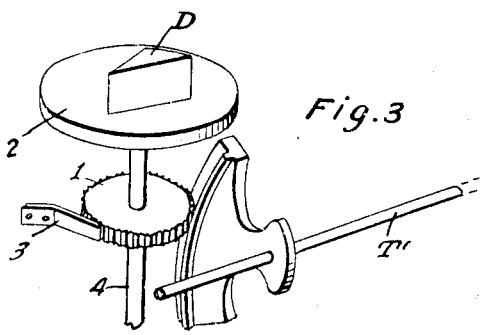

Oct. 4, 1932.  G. Q. VOIGT  1,881,336
METHOD OF COLOR DETERMINATION OF ANY OBJECT

Filed Jan. 22, 1930

Georges Quentin Voigt
INVENTOR.

Patented Oct. 4, 1932

1,881,336

UNITED STATES PATENT OFFICE

GEORGE QUENTIN VOIGT, OF MEDFORD, MASSACHUSETTS

METHOD OF COLOR DETERMINATION OF ANY OBJECT

Application filed January 22, 1930. Serial No. 422,688.

My invention relates to the means of automatically recording the color content of any object whatsoever, and this apparatus contains a minimum of moving parts, resulting to give indefinite life to the most vital parts of the system.

I attain these results by the mechanism illustrated in the accompanying drawing, in which—

Figure I is a diagrammatic sketch of the entire apparatus.

Figures II and III are detail drawings showing the arrangements of apparatus carrying the same designations corresponding with those parts labeled in Figure I.

At A, may originate visible or invisible light or both, and then pass through slit B of controlled dimensions and enter the prism D (of the type which furnishes the desired portion of the visible or invisible spectra or both) where it is divided into a continuous or non-continuous spectra E. This said prism is rigidly fixed to a turntable 2, which in turn is rigidly fixed to the shaft 4 to which is rigidly attached the gear 1, and actuated by intermittent contact with the rotating worm or spiral gear 5, and provided with a ratchet device 3, to maintain the position of the aforesaid gear 1, when actuated by the aforesaid gear 5, which is rigidly fixed to the shaft T' as shown, the latter being rotated by the motor X by means of the meshed gears S and S', rigidly attached respectively to shafts T' and T, the latter fixed to the shaft of motor X.

E, the ray of light of a definite wavelength or wavelengths emitted from D, is directed through slit B' of controlled dimensions, and then passes through prism F which divides the ray E into two beams J and J' of equal or of known intensity as desired. At G, a disc (with one or more radial slits) rotated by mutual contact with the disc G', the latter being rigidly fixed to the shaft T') allows both J and J' rays to pass independently of each other, both passing through during the interval of time required to turn the prism D to a new position by the gear 5, in other words, before a light ray resulting from another position of the prism D is produced through the slit B'. These emerging intermittent beams are thenceforward shown as follows on the drawing:

(a) solid lines to show the path of beam J during its portion of the said interval of time required to rotate the disc G to complete one cycle as explained above, and (b) dotted lines to show the path of beam J' during its portion of the said interval of time required to rotate the disc G to complete one cycle as explained above.

Each of these beams is directed upon either straight or concave surfaces H and I, rotated continuously by means of the gears Y and Y' which are rigidly connected to the shaft U' and actuated by gear U, rigidly attached to shaft T'. The beam J is directed upon the surface I, hereinafter termed the tested substance or surface, and the beam J' directed upon H, the material or obpect to be investigated, hereinafter termed the test substance or surface. These surfaces or substances are so placed that the emitted light rays K and K' from I and H respectively are focused through the slit M of controlled dimensions on the sensitive element L, which transforms light energy into electrical energy proportional in intensity to the intensity of light directed on L.

The intermittent electrical energy impulses set up at L, proportional to the alternate light energy impulses K and K' are connected by an electrical circuit to an amplifier O, and thence to a rotating commutator N which, as is well known, will automatically direct these electrical impulse currents to their respective circuits, and actuated by an extension of the shaft T' to which the commutator rotor is rigidly fixed. From N, proceeding along each circuit in the direction of the arrows indicated on the drawing, the paths are designated as follows:

(a) solid lines designate the circuit over which the amplified intermittent electrical energy impulses resulting from K travel, and (b) dotted lines designate the circuit over which the amplified intermittent electrical energy impulses resulting from K' travel.

The solid lines follow to a relay P from N, which, as is well known, automatically controls the intensity of light emitted from I, or incident upon H, by controlling the intensity of the light source A by means of the variable resistance R, in the circuit, the latter being actuated by the motor Q. The dotted line circuit from N follows to a recording galvanometer W, resulting to give an impression on the recording drum V which is rigidly fixed to the rotating shaft T. The recording sheet on the drum V is calibrated previous to the operation with unknown samples, by means of known samples and is graduated accordingly as the results are to be interpreted.

Electric lamps are known to be steady but the amount of light steadily emitted at various wavelengths is different, and this necessitates automatic control to obtain the desired amount at each wavelength.

I claim:

1. The method of recording color comprising, separating light into its constituent wavelengths, separating one constituent wavelength into separate beams, projecting one beam upon a test surface, projecting another beam upon a known tested surface, setting up an electric current having its intensity proportional to the intensity of the light from the test surface, and controlling the intensity of the beam projected upon the test surface, and recording the color effect by the action of the set-up electric current.

2. The method of recording color comprising, separating light into its constituent wavelengths, separating one constituent wavelength into separate beams, projecting one beam upon a test substance, projecting another beam upon a known tested substance, setting up an electric current having its intensity proportional to the intensity of the light from the test substance, controlling the intensity of the beam projected upon the test substance, by varying the intensity of the original light in proportion to the intensity of the light from the known substance, and recording the effect by the action of the set-up electric current.

3. In apparatus for recording color, a source of light, a means to separate the light into its constituent wavelengths, a means to separate one constituent wavelength into separate beams, a test substance, a known tested substance, means to alternately project the beams upon the test substance and upon the known substance, an electric circuit arranged to be actuated by the beam from the test substance, a color recording instrument connected with the circuit, means to regulate the intensity of the source of light comprising a second electric circuit arranged to be actuated by the beam from the known substance.

4. In apparatus for recording color, a source of light, a prism arranged to separate the light into its constituent wavelengths, a second prism arranged to separate each constituent wavelength into separate beams, a means to effect a relative movement between the prisms so that the several wavelengths from the first prism may pass through the second prism, a test substance, a known tested substance, a rotatable disc arranged between the second named prism and said substances and having an opening formed therein so that the beams may be alternately projected upon the test substance and upon the known tested substance, an electric circuit having means to be actuated by the beam from the test substance, a color recording instrument connected with the circuit, means to regulate the intensity of the source of light comprising a second electric circuit having means arranged to be actuated by the beam from the known surface.

5. In apparatus for recording color, a source of light, means to separate the light into its constituent wavelengths and to separate any one of the wavelengths into separate beams, a test substance, an electric circuit having controlling means, a rotary element having an opening so that the beams are alternately projected upon the test substance and controlling means, means actuated by the electric circuit for maintaining at any value the intensity of the light source, a second circuit having controlling means arranged to have the beam from the test substance projected upon the same, and a color recording device connected in the second circuit.

6. The method comprising, separating light into its constituent wavelengths and separating any one constituent wavelength into separate beams, recording the action of one beam projected upon a substance, and maintaining at a given value the intensity of the projected beam.

7. The method comprising, separating light into its constituent wavelengths and separating any one constituent wavelength into separate beams, recording the action of one beam projected upon a substance, and maintaining at a given value the intensity of the projected beam by the action of the other beam.

8. The method comprising, separating light into its constituent wavelengths and separating one constituent wavelength into separate beams, recording the action of one beam projected upon a light responsive surface, and maintaining constant the intensity of the projected beam.

9. The method comprising, separating light into its constituent wavelengths and separating one constituent wavelength into separate beams, recording the action of one beam projected upon a light responsive surface, and maintaining constant the intensity of the projected beam by the action of the other beam.

10. The method comprising, separating light into its constituent wavelengths and separating one constituent wavelength into separate beams, recording the action of one beam projected upon a substance, and controlling the intensity of the projected beams.

GEORGE QUENTIN VOIGT.